US006810192B2

(12) United States Patent
Aude et al.

(10) Patent No.: US 6,810,192 B2
(45) Date of Patent: Oct. 26, 2004

(54) TRAY FOR A COILED OPTICAL FIBER

(75) Inventors: Mark S. Aude, Arlington, MA (US); Arthur W. Johnson, III, Stoughton, MA (US); Jon H. Appleby, Boston, MA (US); Bretton E. Anderson, Atkinson, NH (US); Andre Sharon, Newton Centre, MA (US); Holger Wirz, Brighton, MA (US)

(73) Assignee: kSARIA Corporation, Wilmington, MA (US)

( * ) Notice: Subject to any disclaimer, the term of this patent is extended or adjusted under 35 U.S.C. 154(b) by 191 days.

(21) Appl. No.: 09/900,702

(22) Filed: Jul. 6, 2001

(65) Prior Publication Data

US 2003/0007768 A1 Jan. 9, 2003

(51) Int. Cl.[7] .................................................. G02B 6/00
(52) U.S. Cl. ....................................................... 385/135
(58) Field of Search ......................................... 385/135

(56) References Cited

U.S. PATENT DOCUMENTS

| | | | |
|---|---|---|---|
| 4,336,047 A | | 6/1982 | Pavlopoulos et al. |
| 4,916,811 A | | 4/1990 | Uehara et al. |
| 5,724,469 A | * | 3/1998 | Orlando ....................... 385/135 |
| 5,770,001 A | | 6/1998 | Nagayama et al. |
| 5,835,660 A | * | 11/1998 | Jung et al. ................... 385/137 |
| 5,926,594 A | | 7/1999 | Song et al. |
| 5,970,749 A | | 10/1999 | Bloom |
| 6,003,341 A | | 12/1999 | Bloom |
| 6,088,503 A | | 7/2000 | Chandler et al. |
| 6,122,936 A | | 9/2000 | Csipkes et al. |
| 6,192,180 B1 | | 2/2001 | Kim et al. |
| 6,215,938 B1 | * | 4/2001 | Reitmeier et al. ........... 385/135 |
| 6,237,370 B1 | | 5/2001 | Bloom |
| 6,272,276 B1 | * | 8/2001 | Potteiger et al. ............ 385/135 |
| 6,580,866 B2 | * | 6/2003 | Daoud et al. ................ 385/135 |
| 6,625,374 B2 | * | 9/2003 | Holman et al. .............. 385/135 |

FOREIGN PATENT DOCUMENTS

EP 0215668 A2 3/1987

OTHER PUBLICATIONS

U.S. patent application Ser. No. 09/900,532, filed Jul. 6, 2001, Apparatus And Method for Automatted Proparation Of An Optical Fiber.
U.S. patent application Ser. No. 09/900,712, filed Jul. 6, 2001, Method and Apparatus for Automatically Forming a Coiled Segment of Optical Fiber.
U.S. patent application Ser. No. 09/900,534, filed Jul. 6, 2001, Method and Apparatus For Cleaning An Optical Fiber.
U.S. patent application Ser. No. 09/900,840, filed Jul. 6, 2001, Apparatus and Method for Attaching a Component to a Fiber.
U.S. patent application Ser. No. 09/900,486, filed Jul. 6, 2001, Centralizing Clamp for An Optical Fiber.
U.S. patent application Ser. No. 09/969,894, filed Oct. 2, 2001, Work Pallet for Optical Fiber.
U.S. patent application Ser. No. 09/969,555, filed Oct. 2, 2001, Method and Apparatus for Recoating Optical Fibers.
U.S. patent application Ser. No. 09/969,544, filed Oct. 2, 2001, Optical Fiber Processing System and Method.

* cited by examiner

Primary Examiner—Hae Moon Hyeon
(74) Attorney, Agent, or Firm—Wolf, Greenfield & Sacks, P.C.

(57) ABSTRACT

A transport tray for a coiled fiber including one or more coils of fiber and end portions extending from the coils. The transport tray comprises a base and a receptacle disposed on the base to receive the coils of fiber therein. The receptacle may have a circular shape configured to retain the coils without violating the minimum bend radius of the fiber. A locking mechanism may be provided to secure the coiled fiber in the receptacle. The tray may includes one or more retainers to secure the end portions of the fiber, including fibers having any one of a range of diameters, in one or more desired positions. The tray may also include two or more fiber end retainers interchangeably supported on the base to retain fiber ends having different shapes and sizes. A plurality of registration features may be provided to facilitate transporting and positioning the tray at one or more process stations or tools.

8 Claims, 4 Drawing Sheets

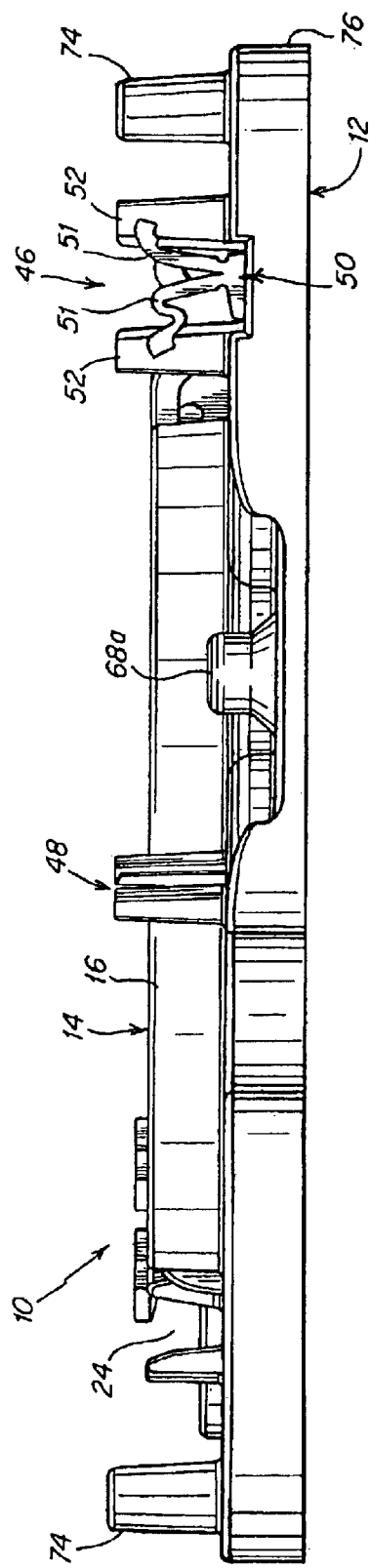
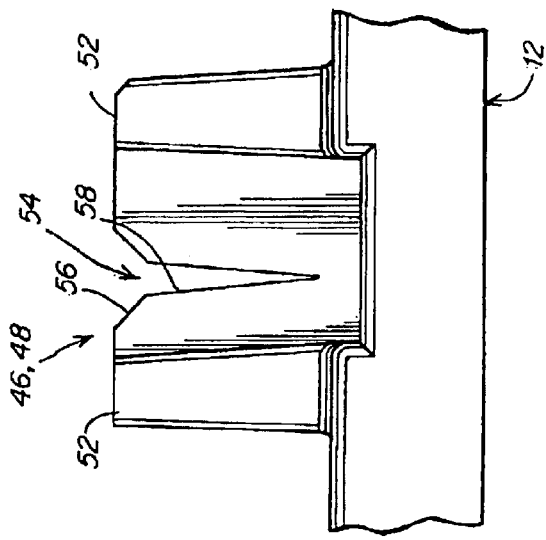

TRAY FOR A COILED OPTICAL FIBER

BACKGROUND OF THE INVENTION

1. Field of the Invention

The present invention relates to a tray for transporting or storing a coiled fiber, and more particularly to a tray for an optical fiber.

2. Description of Related Art

Optical devices are becoming increasingly popular, particularly for use in networking applications. In an optical network or other circuit, optical devices are interconnected via optical fiber, which serves as the transmission medium for transmitting information between the devices. Similarly, an optical device is often made up of multiple optical components that are interconnected, internally within the device, via optical fibers.

The conventional techniques for interconnecting multiple optical components within a device is through the use of a pigtail. A pigtail is essentially a length of optical fiber that includes some type of plug or ferrule attached to at least one end of the fiber. The ferrule provides some structural support to the optical fiber making it easier to handle and to connect directly with optical components or other optical fibers. A pigtail is typically pre-assembled and provided ready to be connected to an optical component. An optical device may utilize one or more pigtails to optically interconnect any number of optical components.

A pigtail is typically assembled by first cutting a desired length of optical fiber from a spool, and winding the fiber into a more compact configuration to facilitate its handling. The coiled fiber may be subject to various manufacturing steps, such as stripping the protective coating off at least one end of the fiber, cleaning the end of the fiber, cleaving the end of the fiber to obtain a high quality optical surface, and attaching a ferrule to the end of the fiber. During the process, the fiber may be handled manually, or placed on some type of transport or holding device.

It is an object of the invention to provide a tray for handling a coiled fiber, such as a coiled optical fiber.

SUMMARY OF THE INVENTION

According to one embodiment of the invention, a transport tray is provided for a coiled fiber including at least one coil of fiber. The tray comprises a base and a circular receptacle disposed on the base. The receptacle is constructed and arranged to receive the at least one coil of fiber therein. The receptacle includes an upstanding wall having at least one opening to allow an end portion of the fiber to extend from the receptacle.

According to another embodiment of the invention, a transport tray is provided for a coiled fiber including at least one coil of fiber. The tray comprises a base constructed and arranged to support the coiled fiber thereon and at least one lock supported on the base to retain the coiled fiber thereon. The at least one lock is operable between a locking position to retain the at least one coil of fiber on the base and an unlocking position to release the at least one coil of fiber from the base.

According to a further embodiment of the invention, a transport tray is provided for a coiled fiber including at least one coil of fiber. The tray comprises a base constructed and arranged to support the at least one coil of fiber thereon in a predetermined location. A first retainer supported on the base is constructed and arranged to maintain an end portion of the coiled fiber in a first orientation relative to the base. A second retainer supported on the base is constructed and arranged to maintain the end portion of the coiled fiber in a second orientation relative to the base that is different from the first orientation.

According to yet another embodiment of the invention, a transport tray is provided for a coiled fiber having one of a range of diameters, the coiled fiber including at least one coil of fiber and an end portion extending therefrom. The tray comprises a base constructed and arranged to support the at least one coil of fiber thereon, and at least one retainer, disposed on the base, that is constructed and arranged to secure the end portion of the fiber to the base at a predetermined location. The at least one retainer is constructed and arranged to secure fibers having any one of the range of diameters.

According to yet a further embodiment of the invention, a transport tray is provided for a coiled fiber including at least one coil of fiber and an end portion extending therefrom having one of a first shape and a second shape that differ from each other. The tray comprises a base constructed and arranged to support the at least one coil of fiber, and first and second retainers interchangeably supported by the base. The first retainer is constructed and arranged to secure the end portion of the coiled fiber to the base when the end portion has the first shape, and the second retainer is constructed and arranged to secure the end portion of the fiber to the base when the end portion has the second shape.

According to still another embodiment of the invention, a transport tray is provided for carrying a coiled fiber including at least one coil of fiber. The tray comprises a base including a receptacle that is constructed and arranged to retain the at least one coil of fiber on the base, and at least one registration feature disposed within the receptacle. The at least one registration feature is constructed and arranged to mate with a corresponding feature to position the base in a predetermined location to receive the coiled fiber in the receptacle.

BRIEF DESCRIPTION OF THE DRAWINGS

In the accompanying drawings, which are herein incorporated by reference, like features that are illustrated in various figures are represented by like reference designations. For purposes of clarity, not every feature may be labeled in every drawing. Various objects and advantages of the present invention will become apparent with reference to the following detailed description when taken in conjunction with the drawings, in which:

FIG. 6 is a side elevational view of the tray of FIG. 1 illustrating one embodiment of a fiber retainer;

FIG. 7 is a schematic view of another illustrative embodiment of a fiber retainer.

DETAILED DESCRIPTION

The present invention is directed to a tray for a coiled fiber, such as an optical fiber. The tray may be configured to transport the fiber through an automated manufacturing process, such as fiber preparation and ferrule attachment to one or both ends of an optical fiber to fabricate a fiber pigtail. The tray may also be configured to maintain one or more portions of the fiber in a desired position to facilitate the manufacturing process. The tray may protect the fiber from damage that can occur due to handling, transportation and/or storage.

The tray may include any one or more of a number of features for retaining the coiled fiber thereon. In this regard, the tray may include a containment feature, such as a receptacle, that receives the coiled fiber and maintains the fiber in a coiled position while the fiber is transported, stored and/or assembled. A locking mechanism may be provided to retain the coiled fiber in the receptacle. One or more retainers may be provided on the tray to hold one or both end portions of the fiber in a selected position, either during transportation or storage of the fiber, or during manufacturing processes on the end portion of the fiber. The retainer may be configured to hold a fiber having any one of a range of fiber diameters or ferrules of various shapes attached to the end of an optical fiber. This feature adds to the utility and convenience of the tray, since it allows the same tray to be used to transport or store fibers having different fiber diameters and/or ferrule shapes.

The tray may also include any one or more of a number of registration features configured to facilitate the handling and positioning of the tray during a manufacturing process. The registration features may be configured to mate with corresponding features provided on one or more manufacturing tools or stations to position the tray relative to the tool or station. Registration features may also be employed to cooperate with a transporter that moves the tray between multiple fiber processing stations.

While the tray is particularly suited for the fabrication, transportation and storage of an optical fiber, it is to be appreciated that the tray may be employed with any type of fiber, wire, cable or cable-like device that may need to be retained in a coiled configuration.

Figure 1:
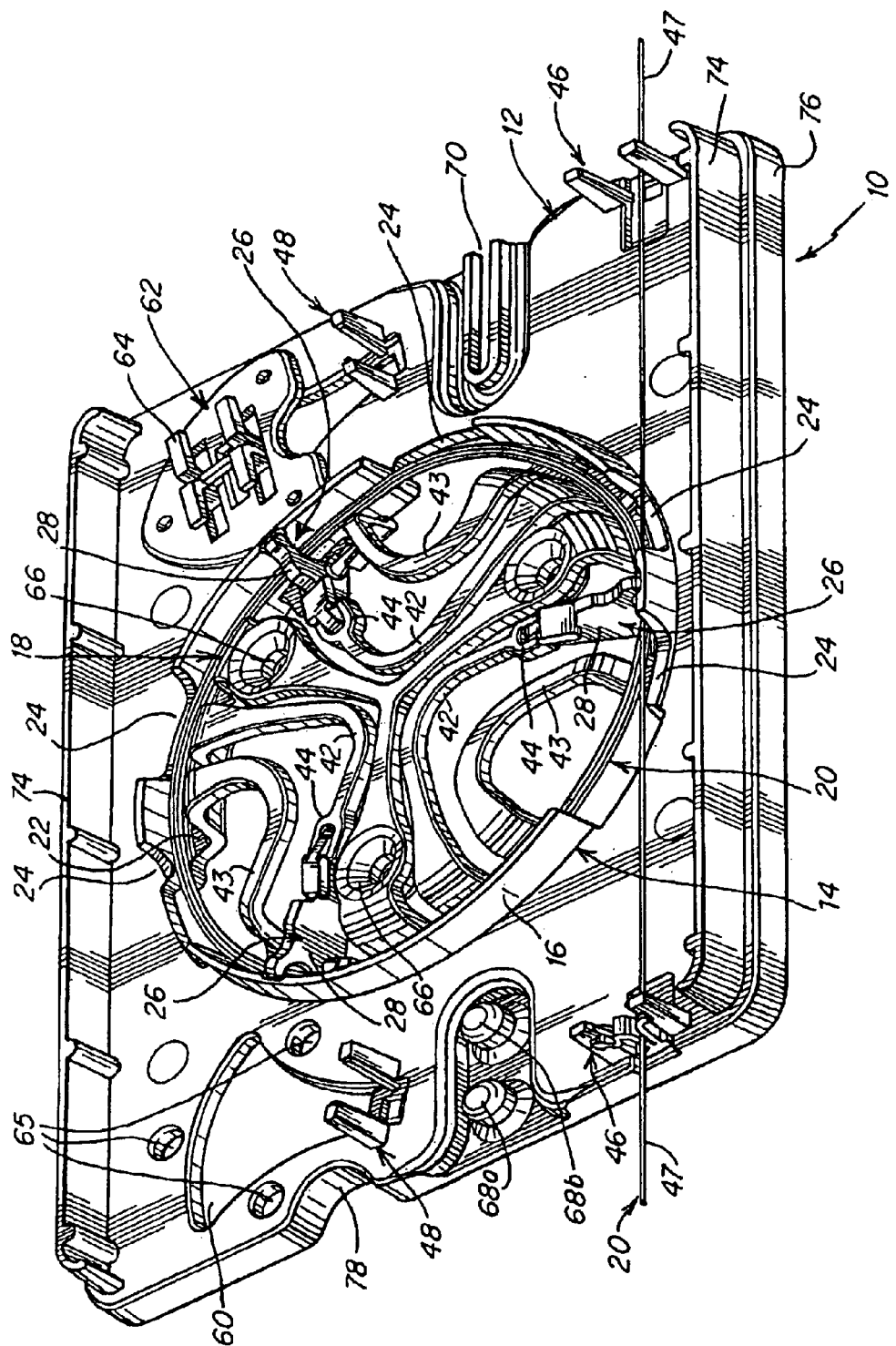
FIG. 1 is a top perspective view of a transport tray for a coiled fiber according to one illustrative embodiment of the invention.
Figure 2:
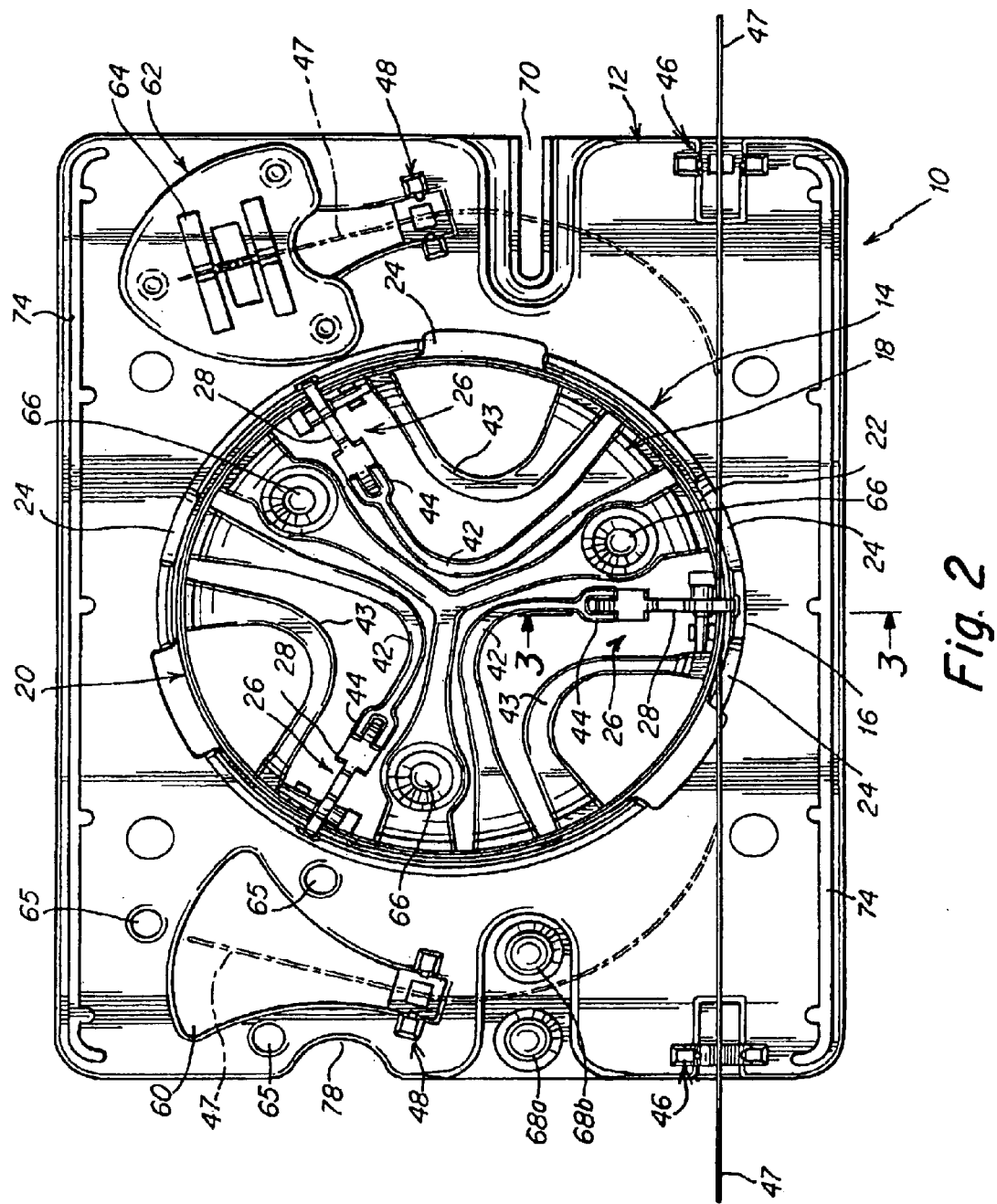
FIG. 2 is a top view of the tray of FIG. 1.

In one illustrative embodiment shown in FIGS. 1–2, the tray 10 includes a base 12 with a receptacle 14 that is configured to receive one or more coils of the fiber 20. The receptacle may be configured to receive the coils of fiber, which have been coiled about a coil axis, in a direction along the coil axis. Alternatively, the fiber may be coiled into the receptacle, also in a direction along a coil axis. As illustrated, the receptacle 14 has a circular shape that is configured to match the shape of the coiled fiber. In this regard, it may be desirable to configure the receptacle with a diameter that equals or exceeds a minimum bend radius allowable for the fiber. This may have particular application for an optical fiber which could be damaged should it be coiled too tightly. In one embodiment, the receptacle has a diameter of approximately 75 mm. It is to be appreciated, however, that the receptacle may be configured to have any suitable shape and size to receive a coiled fiber.

The receptacle 14 is centrally located on the base 12 and configured to position and hold the coiled fiber 20 in a known location on the base. In the illustrative embodiment, the receptacle 14 includes one or more upstanding walls 16 which provide a coil containment feature. The receptacle may also include a central hub 18 spaced inwardly from the wall to form an annular recess 22 in the base 12 that is configured to provide a secure location for the coiled fiber.

It may be desirable to allow one or both end portions of the coiled fiber to extend from the receptacle so that any of a number of various manufacturing processes may be performed on the fiber. For example, it may be desirable to prepare the end portion of an optical fiber held in the tray for attachment of a ferrule. In one embodiment illustrated in FIG. 2, the receptacle wall includes openings or breaks 24 to allow the ends of the coiled fiber to exit from the same general region of the containment receptacle. It is to be appreciated that any number of openings may be located on any desirable portion of the receptacle suitable for any particular application.

To ensure a secure attachment of the coiled fiber within the receptacle, the tray may be provided with a lock mechanism to retain the coiled fiber on the tray. The lock mechanism may be configured to be operable between an open or unlocked position and a closed or locked position. With the lock mechanism in the unlocked position, the coiled fiber may be inserted into or removed from the receptacle, while the fiber is retained in the receptacle when the lock mechanism is in the locked position.

In one illustrative embodiment shown in FIGS. 1–2, the lock mechanism 26 includes a plurality of latches 28 that are movably supported on the base of the tray. Each latch may be rotatably supported from the receptacle wall 16 so as to move toward and away from the inner surface of the receptacle wall between the locked and unlocked positions, respectively. As shown, the lock mechanism may employ three latches 28 equally spaced about the perimeter of the receptacle. It is to be appreciated, however, that any number of latches may be located as desired relative to the receptacle.

Figure 3:
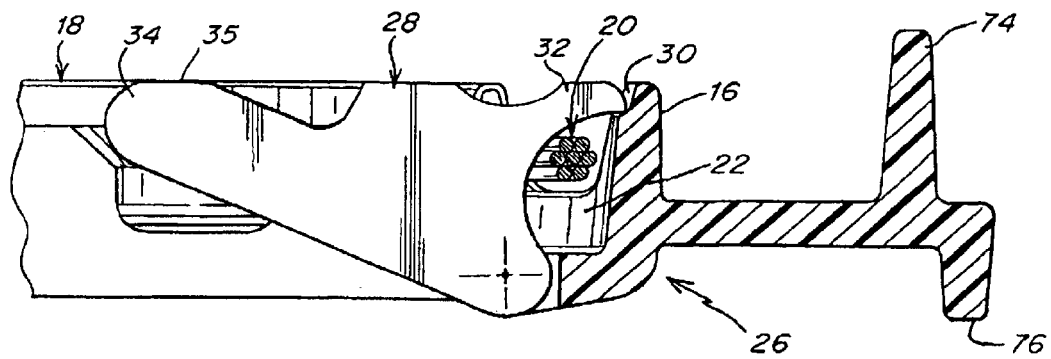
FIG. 3 is a cross-sectional view taken along section line 3—3 in FIG. 2 illustrating one embodiment of a locking mechanism in the closed position.

In the closed position as illustrated in FIG. 3, each latch 28 overlies the recess 22 and engages the inner surface of the receptacle wall 16 to retain the coiled fiber in the receptacle. A portion of the receptacle wall opposite the latch may be provided with a recess or depression 30 that is configured to receive a nose portion 32 of the latch therein to enhance the containment capability of the receptacle.

Figure 4:
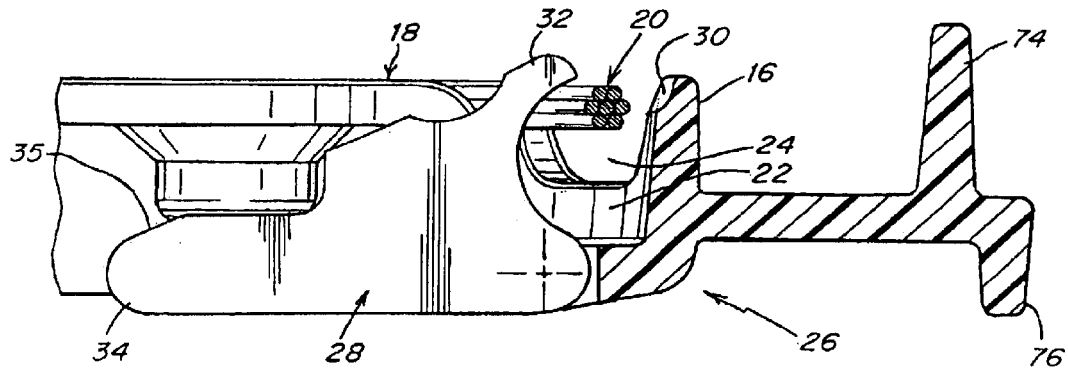
FIG. 4 is the cross-sectional view of the locking mechanism of FIG. 3 in the open position.

In the unlocked configuration as shown in FIG. 4, each latch 28 is rotated away from the inner wall to free the coiled fiber 20 from the recess 22 so that it can be removed from the receptacle. Each latch 28 may be opened by depressing a lever portion 34 of the latch either manually or with a process tool. The latch may include a camming surface 35 configured to receive pressure from an operator or process tool to rotate the latch to the open position.

Figure 5:
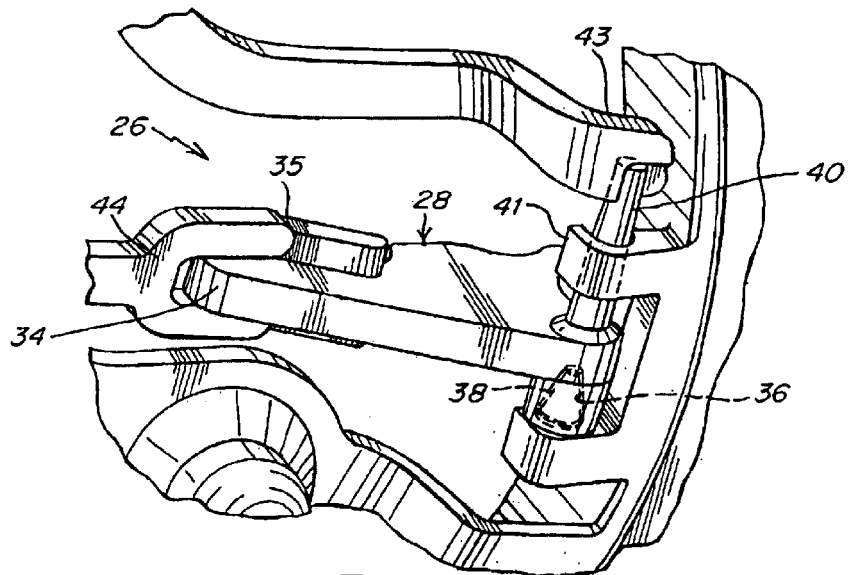
FIG. 5 is a partial, bottom perspective view of the locking mechanism.

As indicated above, each latch 28 is rotatably supported within the receptacle 14. In one illustrative embodiment shown in FIG. 5, one side of the latch includes a conical recess 36 configured to mate with a corresponding conical pin 38 extending from a support provided on the receptacle wall. The opposite side of the latch includes an elongated conical pin 40 that is journaled on a support 41 provided on the receptacle wall. The pin 40 is held in the support with a biasing member, such as a cantilevered spring 43, that engages the tip of the pin. It is to be appreciated that other connection arrangements may be employed to rotatably mount the latches to the tray.

To ensure that the latch 28 securely maintains the fiber within the receptacle, the latch may be biased toward the closed position and into engagement with the wall. In one illustrative embodiment shown in FIGS. 1–2, each latch is biased toward the closed position with a cantilevered leaf spring 42. The spring includes a U-shaped end 44 that is slidably coupled to the lever portion 32 of the latch. The spring may be configured to preload the latch to ensure that it engages the wall in the closed position with some amount of locking force.

As illustrated, the spring 42 may be curved to provide a spring length capable of generating a desired amount of spring force. The spring may also have a tapered shape along its length to distribute force evenly along the length of the spring.

Since it may be desirable to secure the end portions of the fiber to facilitate a manufacturing process, reduce potential damage to the ends and the like, the tray 10 may be provided with one or more retainers configured to hold end portions of the fiber in one or more orientations. In this regard, one or both end portions may be positioned to allow work to be done on the ends of the fiber while the remainder of the fiber is maintained in the coiled configuration, thus precluding the need to uncoil and recoil the fiber during assembly procedures. Conversely, one or both end portions may be positioned on the tray in a storage position to protect the ends from potential damage during handling, transport, storage and the like.

As shown in the illustrative embodiment, the tray 10 includes a pair of first retainers 46 and a pair of second retainers 48 positioned on the tray to hold the end portions of the fiber in one or more predetermined locations or orientations.

The first retainers 46 are aligned with each other at opposite ends of the tray to allow each end 47 of the fiber to extend outwardly from the tray. This orientation positions the fiber ends in readily accessible locations to facilitate manufacturing processes on one or both ends of the fiber. For some applications, the tray may be positioned so that the same or different processes may be performed simultaneously on both ends of the fiber. For an optical fiber, this orientation may be suitable for stripping, cleaning, cleaving, ferrule attachment and the like to the ends of the fiber.

The second retainers 48 are positioned on the tray base at an orientation that differs from the first retainers 46 to maintain the fiber ends 47 within the confines of the tray (shown in phantom). In one embodiment, the second retainers are located on the base of the tray such that the minimum bend radius of the fiber is maintained when the end of the coil extends from the receptacle 14 to the retainer 48. The minimum bend radius of the fiber may thus, at least to a certain degree, dictate the size of the tray, and also define the location and angular orientation of the retainers. The second retainers 48 are particularly suited to storing the end portions 47 of the fiber on the tray to reduce the possibility of damaging the fiber ends during handling, transportation, storage and the like. It is to be understood that the number and location of retainers may vary to suit any desirable application.

Each retainer 46, 48 may be configured to hold a fiber having any one of a range of diameters. This feature provides flexibility and allows the same tray to be used in many different applications for various fibers. For example, one application in which the tray may be particularly useful is the preparation of coiled optical fiber. At present, the industry uses several standard optical fibers having diameters ranging from 180 μm to 900 μm. It is desirable that the same tray may be used to transport or store any of these fibers. Therefore, the retainer is configured to accommodate a range of diameters.

In one illustrative embodiment shown in FIG. 6, the retainer includes a spring-type clip 50 that is attached to the base between a pair of opposing posts 52. The clip includes a pair of resilient legs 51 arranged in a generally V-shaped configuration. The upper ends of the legs 51 press against the posts 52 to urge the legs toward each other to grip a fiber placed between them. The resiliency of the legs allows the retainer to grasp fibers having any of a range of outer diameters with sufficient force to secure them in the retainer while also limiting potential damage to the fiber. The clip 50 may be a detachable part configured to be plugged into a hole in the base between the posts.

Since it may be desirable to limit the number of separate components for the tray, the retainers 46, 48 may be integrally formed with the base of the tray. In one illustrative embodiment shown in FIG. 7, the retainer includes a tapered notch 54 integrally formed between the posts 52. The retainer includes opposing sidewalls that converge toward each other from the top end of the posts toward the bottom end of the posts to form the notch.

As illustrated, the taper may be non-uniform and become steeper at the lower portion. This allows for more secure holding of narrower fibers. In one embodiment, the walls 56 along the upper portion of the notch may be angled approximately 12° relative to a vertical line through the center of the notch, while the walls 58 along its lower portion may be angled approximately 8° from the vertical line. These exemplary angles may be suitable for constraining fibers having an outer diameter from approximately 180 μm to approximately 900 μm. It is to be appreciated that retainers having any suitable configuration may be employed to secure the fiber ends in the tray.

While the second retainers position the end portions of the fiber within the tray for protection, the fiber ends may nevertheless be susceptible to damage. For example, the end of an optical fiber may become scratched, chipped or suffer other damage from contact with the tray. Thus, it may be desirable to configure the tray to avoid contact with the fiber end.

In one illustrative embodiment shown in FIGS. 1–2, the tray includes an aperture 60 in the base located proximate to the second retainer 48. The aperture allows the fiber end 47 extending beyond the retainer to "float" without contacting the base of the tray. As shown, aperture 60 may be bell-shaped or cone-shaped, to allow for movement of the end of the fiber extending beyond the retainer. It is to be appreciated, however, that the aperture may be any desired shape.

For some applications, it may be desirable to further secure the fiber ends to the tray, rather than allowing the end to float. For example, due to the added weight of a ferrule, it may be advantageous to secure the ferrule to the tray. In one illustrative embodiment, a fiber end retainer 62 may be provided adjacent one or both of the second retainers 48 to secure that portion of the fiber end 47 extending beyond the second retainer. The fiber end retainer 62 may include a clip 64 that is configured to retain the fiber end and or ferrule attached to the fiber end. The retainer 62 may be attached to the base using one or more snaps, studs, or other suitable fastener that is configured to mate with a corresponding feature, such as a hole 65, on the base of the tray. As shown, the fiber end retainer 62 may be adapted to fit over the aperture 60 described above. It is to be appreciated that the fiber end retainer may be attached to the tray using any suitable fastening arrangement and it may be configured to accommodate a fiber end and/or ferrule having any shape and/or size.

Since fibers and/or ferrules have various shapes and sizes, the tray may be provided with at least two interchangeable retainers 62 that are detachably supported on the base of the tray. Depending on the size or shape of the fiber or component, such as a ferrule, attached to the fiber end, one of the retainers may be selectively attached to the base. Any number of interchangeable retainers may be provided to accommodate a variety of shapes and sizes of fibers and ferrules, which allows the same tray to be used in any number of applications.

To enhance the utility of the tray for one or more manufacturing applications, the tray may be provided with one or more registration features to facilitate handling, positioning and/or maintaining the tray, and a coiled fiber contained thereon, in a desired location. For example, the registration features may be provided to align and mate the receptacle with a fiber spooling and insertion tool. Other examples include, but are not limited to, registration features for positioning and maintaining the tray at one or more various manufacturing stations, and coupling the tray to a transporter that carries the tray between various locations.

In one illustrative embodiment, the tray includes a plurality of receptacle registration features 66 located on the central hub of the receptacle that are configured to cooperate with corresponding features on a fiber spooling and insertion tool to facilitate transfer of coiled fiber from the tool to the receptacle. These registration features may be separate and independent from any other registration features on the tray that may be used to transport the tray from one location to another. This allows the coiled fiber to be accurately positioned in the receptacle regardless of any system tolerances or uncertainty in the location of the tray that may arise from other tools. As shown, three registration features are arranged in a triangular configuration. The receptacle registration features 66 are configured as upwardly facing recesses having a funnel or frusto-conical shape to facilitate mating with corresponding conical pins on the tool. It is to be appreciated, however, that any number of registration features may be provided having any shape and arrangement as desired.

As indicated above, the tray may also include one or more registration features for transporting and positioning the tray at one or more process tools. In one illustrative embodiment, the tray includes a pair of registration holes 68a, 68b at one end and an elongated slot 70 at the other end of the base that are linearly aligned with each other. The slot 70 provides some flexibility in the registration and prevents the tray from being over-constrained. The outer hole 68a and slot 70 may be employed to position the tray relative to a process tool, while the inner hole 68b may cooperate with the slot 70 for transporting the tray between various process tools. The holes and slot are configured as downwardly facing recesses having a funnel or frusto-conical shape to facilitate mating with corresponding pins on a locating and/or transporting device. This feature allows the tray to be positioned accurately with respect to one or more tools that perform operations on the ends of the fiber. As mentioned previously, this feature may be independent of another registration feature used to position the tray to receive the coiled fiber. It is to be understood that any number and arrangement of registration features having any suitable shape may be implemented on the tray.

The tray may be provided with a stacking feature to facilitate manufacturing processes and/or storage by allowing a plurality of trays to be stacked on top of one another. In one illustrative embodiment, the tray includes one or more upstanding ribs 74 along the perimeter of the base and a complementary skirt 76 extending downwardly from the perimeter of the base. The skirt 76 is configured to mate with and rest on the upstanding ribs 74 of an adjacent tray. The skirt and ribs may also be configured to interlock in a manner that reduces movement between stacked trays.

Since the tray, as illustrated, has an asymmetrical configuration, it may be desirable to provide a keying feature to ensure that the tray is properly oriented during a manufacturing process. In one embodiment, the tray includes a key 78 in the form of a semi-circular relief along one end of the base. The key 78 ensures that the tray is positioned in a particular orientation when used in conjunction with a tool having a corresponding keying feature. Of course, the tray may incorporate any suitable keying feature.

The tray may be formed from a material capable of withstanding relatively high temperatures, for example up to 150° C., since for some applications, such as optical fiber preparation and assembly, the tray may need to be subjected to high temperatures to set and cure an adhesive employed to attach a component, such as a ferrule, to the fiber. It may also be desirable to use a material that is resistant to various process chemicals and/or meets industry standards regarding electrostatic discharge (ESD). The retainers may be formed from the same or a more compliant material for accommodating various shapes and sizes of fiber and ferrules while also reducing potential damage to the components. In one embodiment, the tray is injection molded from a carbon-filled polysulfone plastic material and the plug-in retainers 50, 62 are molded from a copolyester elastomer, such as Arnitel UM551 available from DSM Engineering Plastics. It is to be appreciated, however, that the tray and retainers may be formed of any suitable material using any manufacturing process.

As illustrated, the tray may have a rectangular base configuration with the circular receptacle centrally located on the base. In one embodiment, the tray has a width of approximately 4.5 inches, a length of approximately 6.0 inches and a height of approximately 0.5 inches. The tray is also configured with a stackable pitch distance of approximately 0.375 inches. It should be understood that the tray may be configured to have any suitable size and shape for an application.

Having described several illustrative embodiments of the invention in detail, various modifications and improvements will readily occur to those skilled in the art. Such modifications and improvements are intended to be within the scope of the invention. Accordingly, the foregoing description is by way of example only and is not intended as limiting. The invention is limited only as defined by the following claims and the equivalents thereto.

What is claimed is:

1. A transport tray for a coiled fiber including at least one coil of fiber, the transport tray comprising:
   a base;
   a circular receptacle disposed on the base that is constructed and arranged to receive the at least one coil of fiber therein, the receptacle including an upstanding wall having at least one opening therein to allow an end portion of the fiber to extend from the receptacle;
   at least one retainer disposed on the base, the at least one retainer being constructed and arranged to secure the end portion of the fiber to the base at a predetermined location;
   an aperture formed in the base and located proximate to the at least one retainer such that an end of the fiber extending beyond the retainer overlies the aperture; and
   at least one fiber end retainer to secure the end of the fiber, the fiber end retainer being supported by the base over the aperture.

2. The transport tray as claimed in claim 1, wherein the circular receptacle has a diameter that is sized to maintain the at least one coil of fiber at a coil diameter that is greater than a minimum bend radius of the fiber.

3. The transport tray as claimed in claim 1, wherein the at least one retainer is constructed and arranged to secure fibers having any one of a range of diameters.

4. The transport tray as claimed in claim 1, wherein the end of the fiber has one of at least two different shapes, the fiber end retainer including at least first and second fiber end retainers interchangeably supported by the base, the first fiber end retainer being adapted to secure the end of the fiber having a first shape and the second fiber end retainer being adapted to secure the end of the fiber having a second shape.

5. The transport tray as claimed in claim 1, further comprising a locking mechanism supported on the base to retain the coiled fiber within the receptacle, the locking mechanism being movable between an open position and a closed position.

6. The transport tray as claimed in claim 5, wherein the locking mechanism is adapted to be moved between the open and closed positions by an axially directed force with respect to the receptacle.

7. The transport tray as claimed in claim 5, wherein the locking mechanism comprises at least one latch adapted to engage an inner surface of the upstanding wall.

8. The transport tray as claimed in claim 1, further comprising at least one registration feature located within the circular receptacle and adapted to mate with a corresponding feature provided on one or more manufacturing tools or stations to position the receptacle in a predetermined location relative to the one or more manufacturing tools or stations to receive the coiled fiber in the receptacle.

* * * * *